United States Patent [19]

Berman

[11] Patent Number: 5,513,066
[45] Date of Patent: Apr. 30, 1996

[54] VIDEO RECORDING TRAVELING CART

[75] Inventor: Jessica R. Berman, North Miami Beach, Fla.

[73] Assignee: Video Express System, Inc., Miami Beach, Fla.

[21] Appl. No.: 286,518

[22] Filed: Aug. 5, 1994

[51] Int. Cl.⁶ .................................................. G03B 29/00
[52] U.S. Cl. .................. 361/625; 280/47.26; 312/249.8; 354/81
[58] Field of Search ...................... 354/81, 293; 307/150; 280/33.995, 33.997, 47.2, 47.26, 47.33; 222/25, 26, 30; 206/328, 332; 221/2, 92; 220/908, 909, 485; 248/129, 130, 135, 136, 316.7; 312/114, 117, 249.8, 249.11; 361/600–602, 622, 625, 641, 658, 679, 724–726, 807, 809, 810, 829

[56] References Cited

U.S. PATENT DOCUMENTS

| | | | |
|---|---|---|---|
| 4,864,334 | 9/1989 | Ellis | 354/81 |
| 4,922,721 | 5/1990 | Robertson | 62/3.61 |
| 5,098,250 | 3/1992 | Carson | 414/411 |
| 5,275,365 | 1/1994 | Gerbel | 248/129 |
| 5,314,243 | 5/1994 | McDonald | 312/249.11 |

Primary Examiner—Gerald P. Tolin
Attorney, Agent, or Firm—Malin, Haley, DiMaggio & Crosby

[57] ABSTRACT

A recording equipment travel cart for easily transporting video recording equipment used in video depositions, wherein the cart comprises at least two compartments, wherein one compartment is detachable from the main compartment, and casters are provided for easily rolling and transporting the cart. In addition, the recording equipment travel cart includes foam cushion on the interior section to protect the equipment and cabling to make the required connections with the equipment.

4 Claims, 3 Drawing Sheets

VIDEO RECORDING TRAVELING CART

BACKGROUND OF THE INVENTION

1. Field of the Invention

This invention relates generally to a recording equipment travel cart for the convenient transportation of equipment used in legal video depositions, and more particularly, to a compact travel cart for easily and safely transporting rack-mounted video deposition equipment such as camcorders, cassette players, audio mixers, monitors, cables, and microphones to reduce setup and loading time and for other conveniences.

2. Description of the Prior Art

Video recorded legal depositions require the use of numerous pieces of expensive equipment. Equipment typically used includes camcorders, cassette players, audio mixers, LCD monitors, microphones, several hundred feet of cable, microphones, and power cables. This equipment is expensive to purchase, replace, maintain, and transport.

Damage commonly occurs during transportation because the equipment is bulky, awkward to carry, and requires numerous trips. In addition, it is often time consuming to load the equipment, set up the equipment, and then break down and reload it again. Any time spent setting up and loading equipment detracts from time that could be spent covering depositions.

Accordingly, a travel cart capable of reducing travel, loading, and setup time while providing protection to the equipment and convenience in transporting would be well received. The instant invention resolves the above-noted problems by providing a detachable two-part cart having a collapsible handle, lockable wheels, protective covering, securing straps, prearranged rack equipment, cables, and a hardwired panel all contained in one travel cart for easy setup, storage, and transportation between depositions.

SUMMARY OF THE INVENTION

In light of the above-noted, it is an object of the instant invention to provide a recording equipment travel cart that protects equipment while easily transporting it between depositions.

It is another object of the instant invention to provide a deposition travel cart that reduces the time it takes to setup and breakdown the equipment.

These and other objects are achieved by the instant invention which contemplates a recording equipment travel cart, typically used in video depositions, comprising a lightweight travel cart, lockable wheels, a collapsible handle, and all the equipment necessary to take a video deposition. The equipment is rack-mounted in one cart. The travel cart is made of a lightweight ABS plastic, weighing approximately 40 lbs. and having a pull-up handle in the back of the cart that locks in two positions. The cart also includes wheels or casters with a kick-plate in the back of the cart for easy movability and for locking the wheels in place.

All the equipment required for taking a video deposition is rack-mounted on the cart in two separate compartments. The rack-mounted equipment in the first compartment, or front lid, generally consists of a Panasonic AG-455U camcorder, a front-loading cassette player, one shared 267 4-channel audio mixer, and one Sony LCD monitor mounted on a pivot arm to enable tilting in any direction. The equipment is protected by hook and loop securing straps and a hard plastic cover such as that manufactured by ABS Plastics. The first compartment is removable and has an inside cushioned cover held in place by at least one hook and loop strip. The camcorder is protected by a custom foam cushion or insulation cut to fit snugly around the camera. It should be noted that any of this equipment may be substituted with equipment marketed under a different trade name or mark.

A second compartment, or rear lid, houses three retractable cabling units, one of which comprises 40 ft. of cable for servicing four microphones. Another cable is coupled to the camera and it contains five separate cables for connecting to the individual camera ports or feeds. The third cable houses an AC power cord at least 25 ft. long. The AC power cord is normally located toward one side of the rear lid.

The rear lid is preferably hinged on one side to a main body. The front lid is releasably attached to the opposite side of the main body. All the equipment contained in the cart is hardwired to the back section in the middle of the cart, or main body, to eliminate setup time. Finally, the deposition video cart is designed so that the front lid is detachable or separable from the main body of the cart. This allows the cart and front lid to be easily stored in the trunk of a car for easier transportation to various deposition sites.

In accordance with these and other objects which will become apparent hereinafter, the instant invention will now be described with particular reference to the accompanying drawings.

DESCRIPTION OF THE PREFERRED EMBODIMENTS

Figure 1:
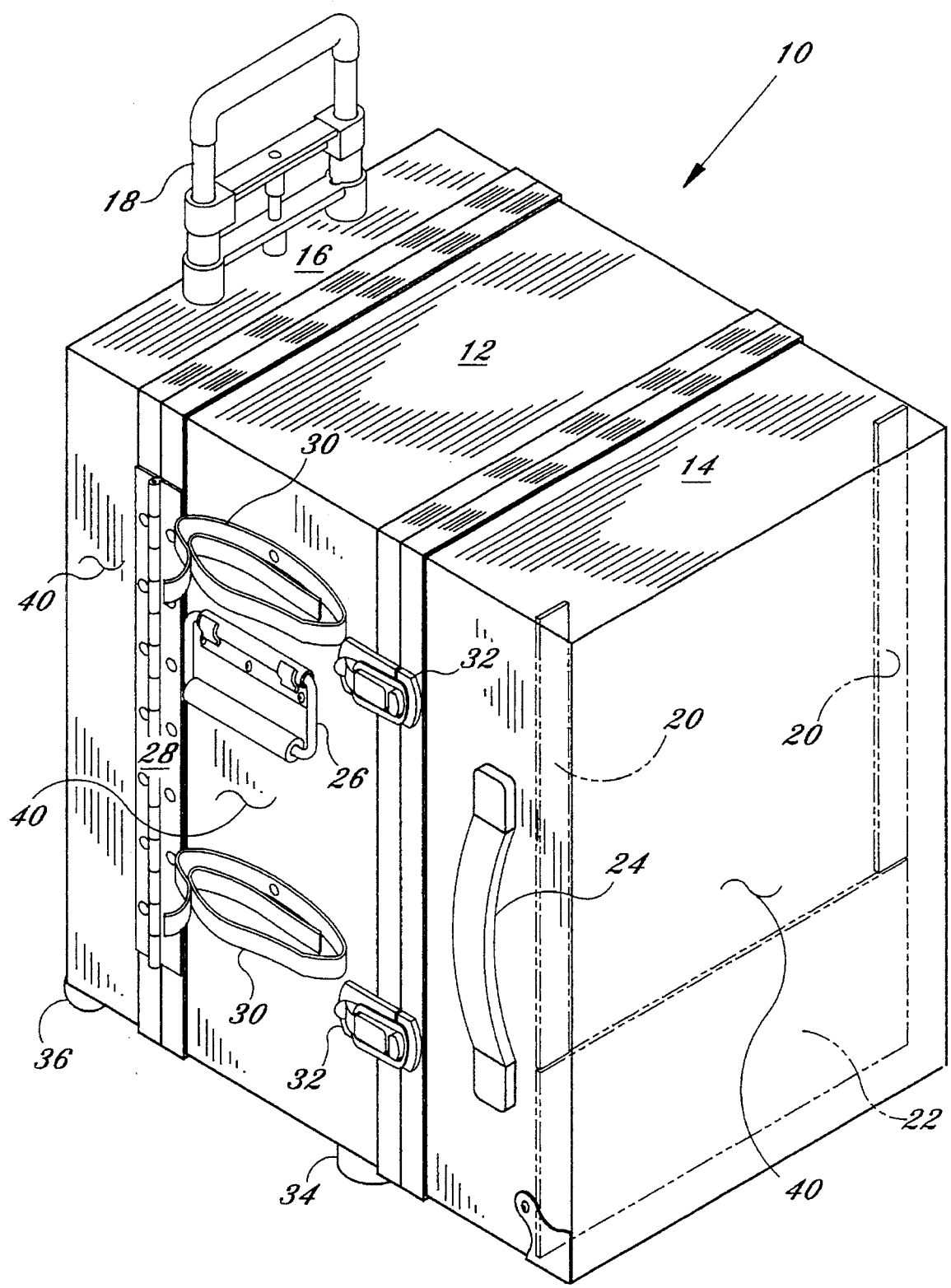
FIG. 1 is a perspective view of the instant invention, illustrating the recording equipment travel cart.
Figure 2:
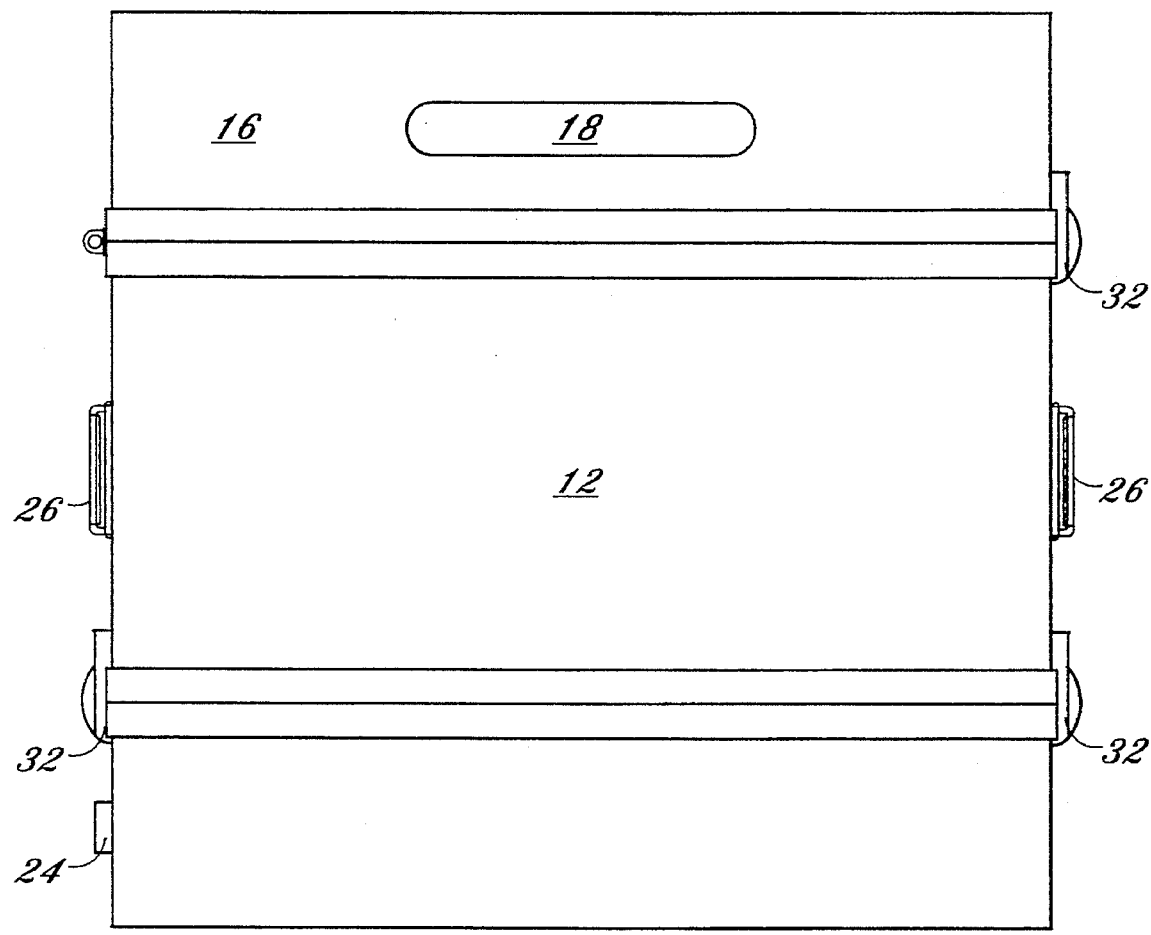
FIG. 2 is a front view of the instant invention, illustrating the front of the front lid or first compartment.
Figure 3:
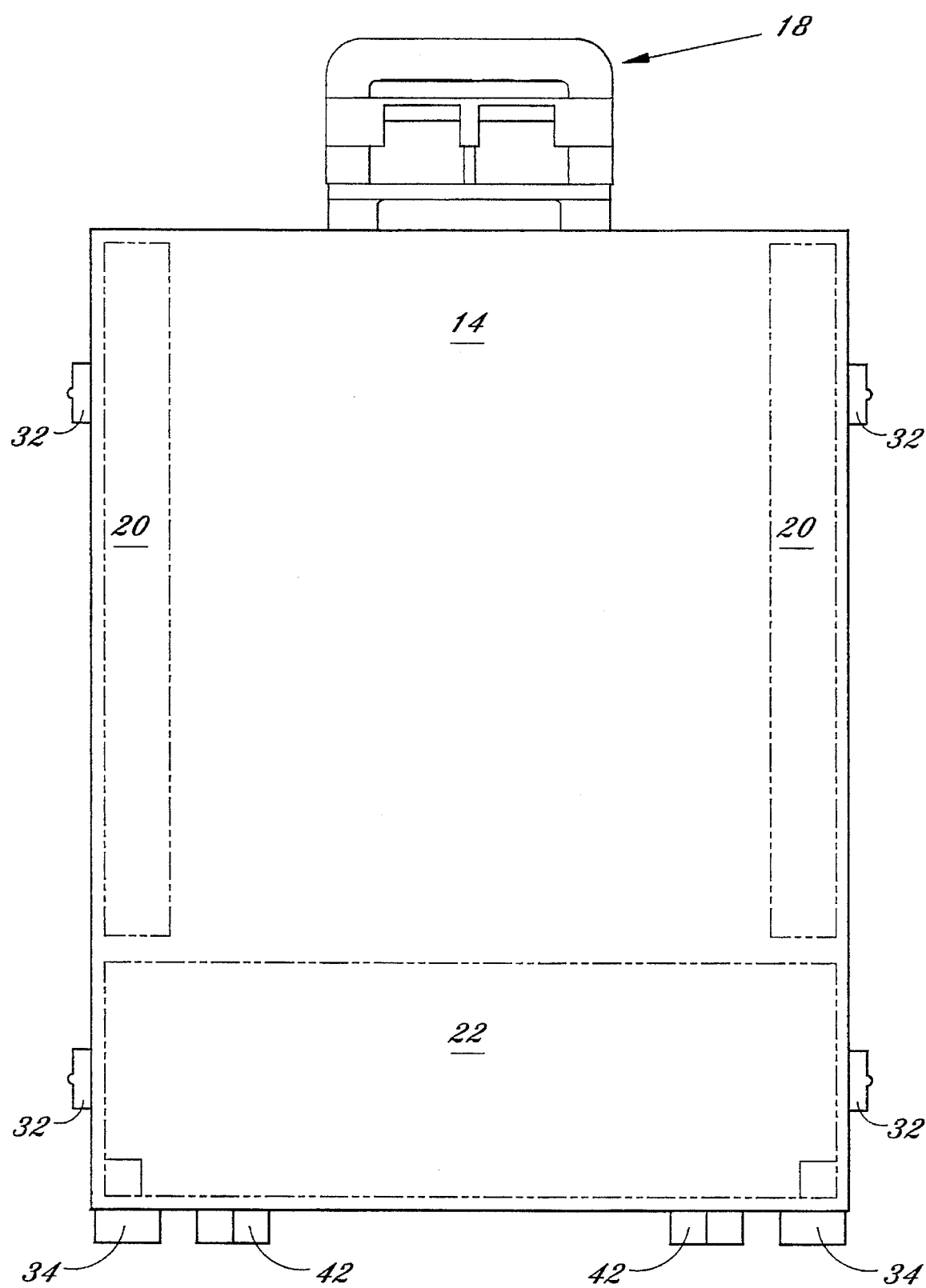
FIG. 3 is a top view of the instant invention, illustrating the three bays and the handles.

With reference to the drawings, FIGS. 1–3 depict a deposition or recording equipment travel cart generally indicated by the reference numeral 10, comprising a main bay or body 12, a front lid or bay 14, a back lid or bay 16, handles 24, 26, and 18, casters 34 and 36, and a storage compartment 22. With reference to FIG. 1, the instant invention or travel cart 10 is shown in perspective, illustrating the front bay 14, the main bay 12, and the back bay 16. As seen in FIG. 1, the front bay 14 is connected to the main bay 12 by fasteners 32, such as quick-release, snap and lock or locking draw bolts. The front bay 14 is detachable from the main bay 12 to facilitate easy and quick storage into closets or the trunk of a car for transportation. The back bay 16 is connected to the main bay 12 by piano hinges 28 as shown. Casters 36 are rotatably connected to the bottom end of back bay 16 and a handle 18 is provided on the top of the back bay 16 for controlling movement of the travel cart 10. Additional hidden casters 34, shown in FIGS. 1 and 3, are also provided to facilitate easier transportation. The handles 24, located on the sides of the front bay 14, help to pull along the cart as it travels on its casters 36 and 34. Also shown in FIGS. 1 and 3 are equipment racks 20 which are used to mount the equipment inside the front bay. Similar racks may be provided in the main bay or the rear bay. The back bay 16 stores the three main cables which provide additional cables for the microphones, the camera, feed ports, and the power cable (not shown).

The front bay stores equipment such as the Panasonic AG-455U camcorder, the front-loading cassette player, one shared 267 four-channel audio mixer, and one Sony LCD monitor, which is mounted on a pivot arm to enable tilting in any direction (this equipment is not shown), or similar equipment. This equipment is preferably located in the front bay 14, but may also be housed in the main bay 12. The main bay 12 provides the interface between the front bay 14 and the back bay 16. All the equipment noted above is hardwired or quick-connected to allow the bays to be disconnected, especially the front bay 14. The equipment is secured inside the front bay 14 by hook and loop straps and it is protected by the hard plastic cover of the front bay 14, the main bay 12, and the back bay 16 as referenced by the numeral 40. The equipment inside the front bay 14 is protected by foam insulation lining the interior walls. A specific custom foam cushion is cut out to fit snugly around the camcorder to protect it from impact.

The travel cart 10 is made of a lightweight plastic, weighing approximately 40 lbs., and has a pull-up handle 18 located on the top of the back bay 16 that locks in two positions. The additional handles 24 on the front bay 14 also facilitate movement of the travel cart 10. Handles 26 located on the side of the main bay 12 may be used to lift and load the travel cart. Note that all equipment is maintained inside the cart so that only one piece, that being the travel cart 10, has to be transported and moved to various sites for depositions.

With reference to FIG. 2, a top view of the travel cart 10 is shown, illustrating the hidden casters 38, the main bay handles 26, the front bay 14, the main bay 12, and the back bay 16. The handle 18 may be hidden through the top of the back bay 16 by retracting it into the bay.

FIG. 3 illustrates a front view of the instant invention, showing the front of the front bay 14. Racks 20 are shown in the Figure which are used to mount and help secure the equipment. Additional securing is provided by hook and loop straps, such as that known under the trademark Velcro®, and by additional bolts, brackets, and hardware. A drawer 22 is provided at the bottom of the front bay 14 to store additional equipment or loose items which need to travel to the various sites. The casters 36 and the hidden casters 34, when used, are locked into place by a back plate 42, which either releases or engages the casters to move or secure the cart in place, respectively. The front lid 14 contains an inside cover which is held in place by at least one hook and loop strip. The interior cover serves to insulate the equipment therein from shock as aforementioned.

The present invention 10 contains all the equipment in one movable unit the casters 36 and 34 provide easy transportation. It is intended that the equipment should remain secure and contained within the volume of the front bay 14 and the front bay 14 should be detachable from the main bay 12 to facilitate easier, more convenient travel. The equipment is hardwired to the back section of the main bay 12 or the back bay 16 to help eliminate setup time.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A recording equipment travel cart for moving recording equipment conveniently between locations, said cart comprising:

a rear bay having a top side, a bottom end, and an interior side, said rear bay having a contractible handle connected to its top side which may be contracted into said rear bay for hiding and protecting said handle, said rear bay for housing a plurality of cables for use with said recording equipment;

at least two casters rotatably connected to said bottom end of said rear bay for transporting said cart;

a main bay having a rear side connected to said rear bay interior side by piano hinges, said main bay having a front side, a left side and a right side, at least one handle rotatably connected individually to said right side and said left said, said main bay for storing a connection panel, said main bay having a front surface;

a front bay connected to said main bay front surface by releasable fasteners, said front bay for storing recording equipment, said connection panel interfacing said cables to said recording equipment, said front bay having side panels, said side panels having at least one handle connected thereto for pulling said cart on said casters; and said front bay, said main bay, and said back bay being substantially rectangular in cross section.

2. An apparatus as recited in claim 1, wherein said cart is fabricated from a hard plastic to protect said equipment.

3. An apparatus as recited in claim 2, wherein said front bay is lined with a foam cushion to absorb any shock which may damage said equipment.

4. An apparatus as recited in claim 1, further comprising rubber foot stops depending from said bottom end of said main bay to balance and support said traveling cart.

\* \* \* \* \*